US012683186B2

(12) United States Patent
Kim et al.

(10) Patent No.: US 12,683,186 B2
(45) Date of Patent: Jul. 14, 2026

(54) ALL-SOLID-STATE SECONDARY BATTERY

(71) Applicants: ELECTRONICS AND TELECOMMUNICATIONS RESEARCH INSTITUTE, Daejeon (KR); DAEGU GYEONGBUK INSTITUTE OF SCIENCE AND TECHNOLOGY, Daegu (KR)

(72) Inventors: Ju Young Kim, Sejong-si (KR); Young-Gi Lee, Daejeon (KR); Yong Min Lee, Daegu (KR); Seok Hun Kang, Daejeon (KR); Kwang Man Kim, Daejeon (KR); Ju Mi Kim, Daejeon (KR); Joonam Park, Daegu (KR); Dong Ok Shin, Sejong-si (KR); Jimin Oh, Daejeon (KR); Myeong Ju Lee, Daejeon (KR)

(73) Assignees: ELECTRONICS AND TELECOMMUNICATIONS RESEARCH INSTITUTE, Daejeon (KR); DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 666 days.

(21) Appl. No.: 17/730,106

(22) Filed: Apr. 26, 2022

(65) Prior Publication Data
US 2023/0343994 A1 Oct. 26, 2023

(51) Int. Cl.
H01M 10/0562 (2010.01)
H01M 4/58 (2010.01)
(Continued)

(52) U.S. Cl.
CPC ..... H01M 10/0562 (2013.01); H01M 4/5815 (2013.01); H01M 4/62 (2013.01);
(Continued)

(58) Field of Classification Search
CPC ......... H01M 4/5815; H01M 2004/021; H01M 2004/027; H01M 2004/028;
(Continued)

(56) References Cited

U.S. PATENT DOCUMENTS 7,081,320 B2 * 7/2006 Kawakami ............ H01M 4/622
429/232
10,305,092 B2 5/2019 Jeong
(Continued)

FOREIGN PATENT DOCUMENTS

CN 104577047 * 3/2017
JP 61-295235 * 12/1986
(Continued)

OTHER PUBLICATIONS

Young Jin Nam et al., "Toward practical all-solid-state lithium-ion batteries with high energy density and safety: Comparative study for electrodes fabricated by dry- and slurry-mixing processes", Journal of Power Sources, 2017.
(Continued)

*Primary Examiner* — Laura Weiner

(57) ABSTRACT

The present disclosure relates to an all-solid-state secondary battery, and more particularly, to an all-solid-state secondary battery including a positive electrode, a negative electrode, and a solid electrolyte layer disposed between the positive electrode and the negative electrode. Here, at least one of the positive electrode and the negative electrode includes a sulfide-based active material, the sulfide-based active material has a particle size of about 50 nm to about 5 μm, and the sulfide-based active material has a grain size of about 1 nm to about 10 nm.

9 Claims, 8 Drawing Sheets

(51) Int. Cl.
  H01M 4/62    (2006.01)
  H01M 10/0525  (2010.01)
  *H01M 4/02*    (2006.01)

(52) U.S. Cl.
  CPC ........... H01M 4/622 (2013.01); H01M 4/623
    (2013.01); H01M 4/625 (2013.01); H01M
    10/0525 (2013.01); *H01M 2004/021* (2013.01);
    *H01M 2004/027* (2013.01); *H01M 2004/028*
    (2013.01); *H01M 2300/0068* (2013.01); *H01M*
    *2300/0071* (2013.01)

(58) Field of Classification Search
  CPC .. H01M 10/0562; H01M 4/622; H01M 4/623;
    H01M 4/625; H01M 2300/0068; H01M
    2300/0071
  See application file for complete search history.

(56)     References Cited

U.S. PATENT DOCUMENTS

| | | |
|---|---|---|
| 2016/0028048 A1 | 1/2016 | Lee |
| 2017/0018802 A1* | 1/2017 | Omoda ............... H01M 4/5815 |
| 2018/0108943 A1 | 4/2018 | Shin |

FOREIGN PATENT DOCUMENTS

| | | | |
|---|---|---|---|
| KR | 10-2016-0140030 A | | 12/2016 |
| KR | 10-2018-0057135 A | | 5/2018 |
| KR | 10-1953738 B1 | | 3/2019 |
| KR | 10-2020-0113122 A | | 10/2020 |
| WO | 2016/143701 A1 | | 9/2016 |
| WO | WO 2019/126499 | * | 6/2019 |

OTHER PUBLICATIONS

Yoshikatsu Seino et al., "A sulphide lithium super ion conductor is superior to liquid ion conductors for use in rechargeable batteries", Energy & Environmental Science, 2013.
Ju Young Kim et al., "Revisiting TiS 2 as a diffusion-dependent cathode with promising energy density for all-solid-state lithium secondary batteries", Energy Storage Materials, 2021.
Bum Ryong Shin et al., "Interfacial Architecture for Extra Li+ Storage in All-Solid-State Lithium Batteries," Scientific Reports, Jul. 8, 2014, DOI: 10.1038/srep05572.
Victor Vega-Mayoral et al., "Solvent exfoliation stabilizes TiS2 nanosheets against oxidation, facilitating lithium storage applications," Nanoscale, 2019, pp. 6206-6216, DOI: 10.1039/c8nr09446b.

* cited by examiner

ALL-SOLID-STATE SECONDARY BATTERY

BACKGROUND

The present disclosure herein relates to an all-solid-state secondary battery having improved energy density.

Since a lithium secondary battery may have an energy density greater than that of other batteries and be reduced in size and weight, the lithium secondary battery is highly used as a power source for portable electronic devices. The lithium secondary battery may include a positive electrode, a negative electrode, and an electrolyte. In general, a carbonate-based solvent in which lithium salt ($LiPF_6$) is dissolved is widely used as a liquid electrolyte. The liquid electrolyte exhibits an excellent electrochemical characteristic due to high mobility of lithium ions, but has a limitation in stability due to high combustibility, volatility, and explosion caused by leakage.

Thus, researches on an all-solid-state secondary battery using a solid electrolyte instead of the liquid electrolyte are performed. Since the all-solid-state secondary battery may secure stability and mechanical strength, the all-solid-state secondary battery attracts an attention in various applied systems requiring high stability such as electric vehicles, energy storage systems, and wearable devices.

SUMMARY

The present disclosure provides an all-solid-state secondary battery having an improved energy density.

The object of the present disclosure is not limited to the aforesaid, but other objects not described herein will be clearly understood by those skilled in the art from descriptions below.

An embodiment of the inventive concept provides an all-solid-state secondary battery including: a positive electrode; a negative electrode; and a solid electrolyte layer disposed between the positive electrode and the negative electrode. Here, at least one of the positive electrode and the negative electrode includes a sulfide-based active material, the sulfide-based active material has a particle size of about 50 nm to about 5 μm, and the sulfide-based active material has a grain size of about 1 nm to about 10 nm.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
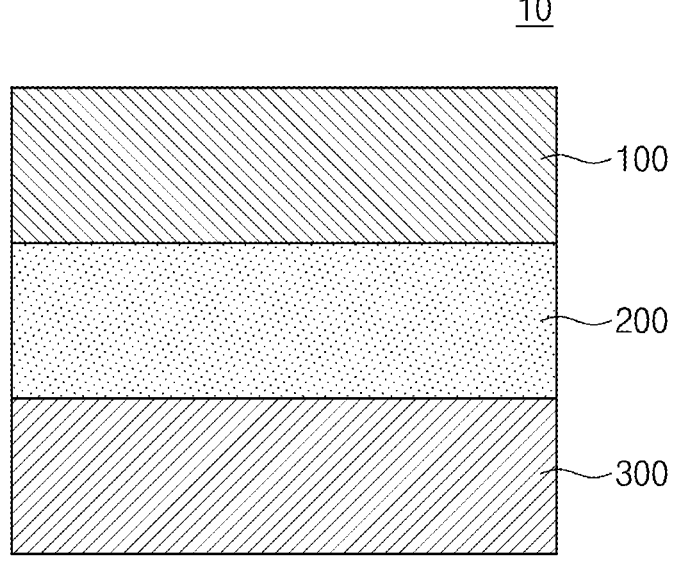
FIG. 1 is a cross-sectional view illustrating an all-solid-state secondary battery according to an embodiment of the inventive concept.

Advantages and features of the present invention, and implementation methods thereof will be clarified through following embodiments described with reference to the accompanying drawings. The present invention may, however, be embodied in many different forms and should not be construed as being limited to the embodiments set forth herein. Rather, these embodiments are provided so that this disclosure will be thorough and complete, and will fully convey the concept of the invention to those skilled in the art. Further, the present invention is only defined by scopes of claims. Like reference numerals refer to like elements throughout.

In the following description, the technical terms are used only for explaining a specific embodiment while not limiting the present disclosure. In the specification, the terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Additionally, the embodiment in the detailed description will be described with sectional views as ideal views of the present invention. Also, in the figures, the dimensions of layers and regions are exaggerated for clarity of illustration. Accordingly, shapes of the views may be modified according to manufacturing techniques and/or allowable errors. Therefore, the embodiments of the present invention are not limited to the specific shape illustrated in the views, but may include other shapes that may be created according to manufacturing processes. Areas exemplified in the drawings have general properties, and are used to illustrate a specific shape of a semiconductor package region. Thus, this should not be construed as limited to the scope of the present invention.

Unless terms used in embodiments of the present invention are differently defined, the terms may be construed as meanings that are commonly known to a person skilled in the art.

Hereinafter, embodiments of the inventive concept will be described in more detail with reference to the accompanying drawings.

FIG. 1 is a cross-sectional view illustrating an all-solid-state secondary battery 10 according to an embodiment of the inventive concept.

Referring to FIG. 1, the all-solid-state secondary battery 10 may include a positive electrode 100, a solid electrolyte layer 200, and a negative electrode 300. The positive electrode 100 and the negative electrode 300 may be opposed to each other. The solid electrolyte layer 200 may be disposed between the positive electrode 100 and the negative electrode 300. The solid electrolyte layer 200 may play a role of transferring ions to the positive electrode 100 and the negative electrode 300. In this specification, each of the positive electrode 100 and the negative electrode 300 may be referred to as an electrode.

At least one of the positive electrode 100 and the negative electrode 300 may include an active material. The active material may play a role of storing lithium (Li) ions. The active material may include a positive electrode active material used in the positive electrode 100 and a negative electrode active material used in the negative electrode 300. The active material may include a material that is mechanically deformed, i.e., deformed in shape, under a pressing condition. The active material may include a sulfide-based active material. For example, the sulfide-based active material may include at least one of titanium disulfide ($TiS_2$), molybdenum disulfide ($MoS_2$) and tungsten disulfide ($WS_2$). The sulfide-based active material may have a two-dimensional layered structure. The two-dimensional layered structure may allow an intercalation reaction by which lithium ions are inserted to an interstitial site in the active material and a conversion reaction by which lithium ions are stored in the active material. The sulfide-based active material may have high amorphousness. For example, the sulfide-based active material may have a mean grain size of about 1 nm to about 10 nm. Also, the sulfide-based active material may have a small particle size. For example, the sulfide-based active material may have a mean particle size of about 50 nm to about 5 μm.

Due to the high amorphousness of the sulfide-based active material, the lithium ions in the active material may have three-dimensional movement directionality, and movement of the lithium ions may be accelerated. Also, as contact between the active materials is improved, lithium ions may be effectively accommodated from the outside. Thus, since electrochemical voltage difference between a surface and an inside of the electrode may be reduced, a resistance value of the all-solid-state secondary battery 10 may be decreased, and an electrochemical property of the all-solid-state secondary battery 10 may be improved.

Each of the positive electrode 100 and the negative electrode 300 may not include a solid electrolyte therein. Due to a relatively soft and ductile property of the sulfide-based active material, the active materials may closely contact each other at interfaces thereof. That is, although the electrode does not include the solid electrolyte therein, the lithium ions may facilely move between the active material particles and be effectively stored. Thus, a content of the sulfide-based active material in the positive electrode 100 and the negative electrode 300 may be maximized, and finally the all-solid-state secondary battery 10 having a high energy density may be realized.

At least one of the positive electrode 100 and the negative electrode 300 may further include a polymeric binder. The polymeric binder may fix the active material to maintain mechanical stability of the secondary battery 10. The polymeric binder may include an aqueous or non-aqueous material. For example, the polymeric binder may include at least one of polytetrafluoroethylene, polyvinylidene fluoride (PVdF), poly(ethylene oxide), polyacrylonitrile, hydroxypropyl cellulose, carboxymethyl cellulose, styrene-butadiene, nitrile-butadiene rubber, polyacrylate, and polyacrylic acid. A concentration of the polymeric binder in the electrode may be about 0.01 wt % to about 5 wt %. However, in some embodiment, each of the positive electrode 100 and the negative electrode 300 may not include the polymeric binder.

At least one of the positive electrode 100 and the negative electrode 300 may further include an electro-conducting agent. The electro-conducting agent may apply electronic conductivity to each of the positive electrode 100 and the negative electrode 300. The electro-conducting agent may include a material having conductivity. For example, the electro-conducting agent may include at least one of graphite, hard/soft carbon, carbon fibers, carbon nanotubes, linear carbon, carbon black, acetylene black, and ketjen black. A concentration of the electro-conducting agent in the electrode may be about 0.01 wt % to about 5 wt %. However, in some embodiment, each of the positive electrode 100 and the negative electrode 300 may not include the electro-conducting agent. Particularly, when the active material has high electronic conductivity, each of the positive electrode 100 and the negative electrode 300 may not include the electro-conducting agent.

Each of the positive electrode 100 and the negative electrode 300 may have porosity equal to or less than about 15%. In some embodiment, each of the positive electrode 100 and the negative electrode 300 may not include a pore. Since a content of the active material in the positive electrode 100 and the negative electrode 300 may be increased as the porosity in the positive electrode 100 and the negative electrode 300 is decreased, the all-solid-state secondary battery 10 having the high energy density may be finally realized. In addition, when the porosity of the electrode is low, the intimate contact between the active material particles may be guaranteed, which could lead facile lithium ion transport between the active material particles.

The solid electrolyte layer 200 may include a sulfide-based material, an oxide-based material, a polymer-based material, or a mixture thereof. The sulfide-based material may include one of $Li_{4-x}Ge_{1-x}P_xS_4$(LGPS), $Li_3PS_4$ glass-ceramic, $Li_7P_3S_{11}$ glass-ceramic (LPS), $Li_4SnS_4$, and $Li_6P_5S_X$ (X=I, Br, Cl). The oxide-based material may include one of $Li_{3x}La_{2/3-x}TiO_3$ (LLTO), $Li_{1+x}Ti_{2-x}M_x(PO_4)_3$ (M=Al, Ga, In, Sc), and $Li_7La_3Zr_2O_{12}$ (LLZO). The polymer-based material may be a gel electrolyte or a polymer electrolyte and provided in a form in which lithium salt is dissociated in a polymer matrix. The polymer-based material may include one of polytetrafluoroethylene, polyvinylidene fluoride (PVdF), poly(ethylene oxide), polyacrylonitrile, hydroxypropyl cellulose, carboxymethyl cellulose, styrene-butadiene, nitrile-butadiene rubber, polyacrylate, and polyacrylic acid. The lithium salt may include one of $LiPF_6$, $LiBF_4$, $LiSbF_6$, $LiAsF_6$, $LiClO_4$, $LiN(C_2F_5SO_2)_2$, $LiN$ $(CF_3SO_2)_2$, $CF_3SO_3Li$, $LiC(CF_3SO_2)_3$, and $LiC_4BO_8$.

The solid electrolyte layer 200 may further include a polymeric binder. Particularly, when the solid electrolyte layer 200 includes the sulfide-based material or the oxide-based material, the solid electrolyte layer 200 may include the polymeric binder. The polymeric binder may be substantially the same as the polymeric binder contained in at least one of the positive electrode 100 and the negative electrode 300.

Thus, the solid electrolyte layer 200 may have improved mechanical stability. The electrode may include at least one of lithium metal, graphite, silicon-graphite composite, silicon, $LiCoO_2$, $LiFePO_4$, $LiMn_2O_4$, $Li_2MnO_3$, $LiNi_xMn_y$-$Co_zO_2$ (x+y+z=1), and $LiNiCoAlO_2$.

In this specification, the electrode opposing to at least one of the positive electrode 100 and the negative electrode 300 containing the sulfide-based active material may be referred to as an opposing electrode. For example, when the positive electrode 100 includes the sulfide-based active material, the negative electrode 300 may be the opposing electrode. On the contrary, when the negative electrode 300 includes the sulfide-based active material, the positive electrode 100 may be the opposing electrode.

Referring to FIG. 1 again, a method for manufacturing the all-solid-state secondary battery 10 according to an embodiment of the inventive concept will be described.

The method for manufacturing the all-solid-state secondary battery 10 may include a process of preparing the sulfide-based active material having increased amorphousness. In order to increase the amorphousness of the sulfide-based active material, a mechanical ball-milling process or an acid treatment process may be performed.

The ball-milling process may mix materials by using a rotation principle of rotation and revolution at the same time and simultaneously maximize crushing and micro-mixing of materials by using an impact caused by a plurality of rigid micro-balls. As a crystalline structure of the sulfide-based active material having high crystallinity is collapsed by the ball-milling process, the amorphousness may be increased. The ball-milling process may have a rotation/revolution speed of about 100 rpm or more and a process time of about 1 hour or more. However, the embodiment of the inventive concept is not limited thereto. For example, the ball-milling process may have a different speed and time according to an amount of the sulfide-based active material.

The acid treatment process may include a process of reacting the sulfide-based active material having high crystallinity and an oxidizing agent (e.g., potassium permanganate ($K_2MnO_4$)). As a crystalline structure of the sulfide-based active material having high crystallinity is oxidized by the acid treatment process, an amorphous structure may be provided. A concentration of the oxidizing agent and a time for the acid treatment process may be adjusted according to an amount of the sulfide-based active material. After the acid treatment process, an oxidation reaction may be finished by adding a large amount of non-reactive solvent, and the sulfide-based active material having increased amorphousness may be separated through a filtration device. In addition to this, an additional heat treatment process may be performed to further increase the amorphousness. The heat treatment process may be performed at a temperature of about 200° C. or more and a process time of about 1 hour or more. However, the embodiment of the inventive concept is not limited thereto. For example, the heat treatment process may be performed with a different temperature and a different time according to the amount of the sulfide-based active material.

A process of mixing the sulfide-based active material having increased amorphousness with the polymeric binder may be performed. The process of mixing the sulfide-based active material with the polymeric binder may include a dry mixing process or a wet mixing process.

In case of the dry mixing process, the sulfide-based active material may be sufficiently mixed with the polymeric binder, and then a free-standing electrode with a designed loading level may be obtained through roll pressing of the mixture.

In case of the wet mixing process, a solvent may be determined according to the kind of the polymeric binder. After the wet mixing process, the electrode may be manufactured through a film formation process (e.g., doctor blade method). A heat treatment process may be performed to improve an adhesion force of the electrode and remove the solvent. The heat treatment process may have a temperature that is adjusted according to a boiling point of the solvent. The heat treatment process may be a process time of about 30 minutes or more. However, the embodiment of the inventive concept is not limited thereto.

In order to improve an interface contact between the sulfide-based active materials, a pressing process may be performed on the electrode. The pressing process may include a roll pressing process or a hydraulic pressing process. The pressing process may have a pressure condition of about 250 MPa or more. In addition, a pressure of about 10 MPa or more may be applied while the all-solid-state secondary battery is driven in order to stably keep the closely formed interface of the sulfide-based active material during charging and discharging.

Embodiment 1

A ball milling process is performed by inputting 3 grams of titanium disulfide and 20 zirconia balls into a ball milling pot. The ball milling process has a rotation speed of about 500 rpm. The ball milling process is performed 40 times by setting 15 minute performance and 10 minute rest as one set. The ball milling process has a total process time of about 10 hours. The sealed pot is used to minimize a reaction with the atmosphere during the ball milling process, and sampling is performed in a globe box filled with an inert gas.

Figure 2:
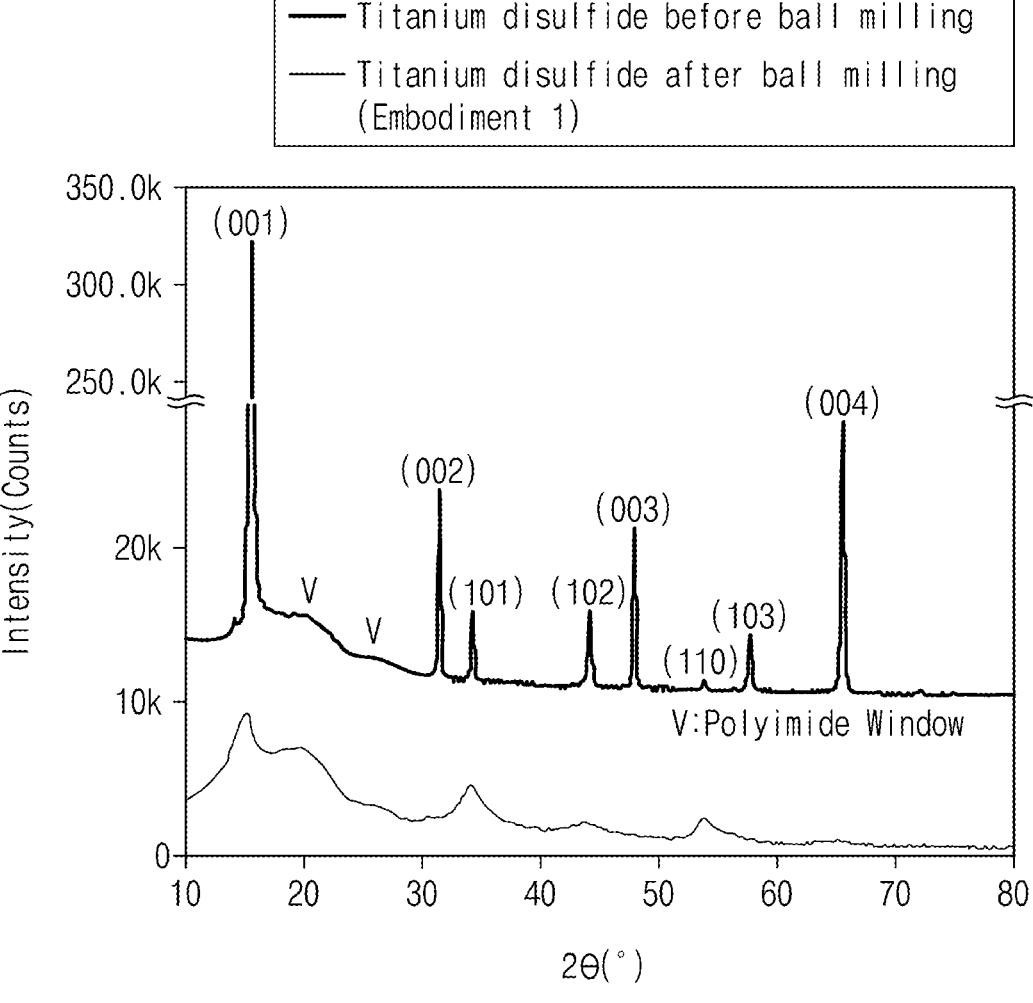
FIG. 2 is a graph showing an X-ray diffraction analysis result of titanium disulfide before and after a ball milling process.

An X-ray diffraction analysis is performed to check whether amorphousness of the titanium disulfide is effectively implemented through the ball milling process, and a result thereof is shown in FIG. 2. Referring to FIG. 2, it may be known that the titanium disulfide has high crystallinity before the ball milling process. However, it may be known that the titanium disulfide has decreased crystallinity and maximized amorphousness after the ball milling process.

An analysis for a grain size is performed through the Scherrer equation. A mean grain size of the titanium disulfide before the ball milling process is measured as about 78.4 nm. On the other hand, a mean grain size of the titanium disulfide after the ball milling process is measured as about 4.4 nm. That is, it may be known that the mean grain size of the titanium disulfide is remarkably reduced.

Figure 3:
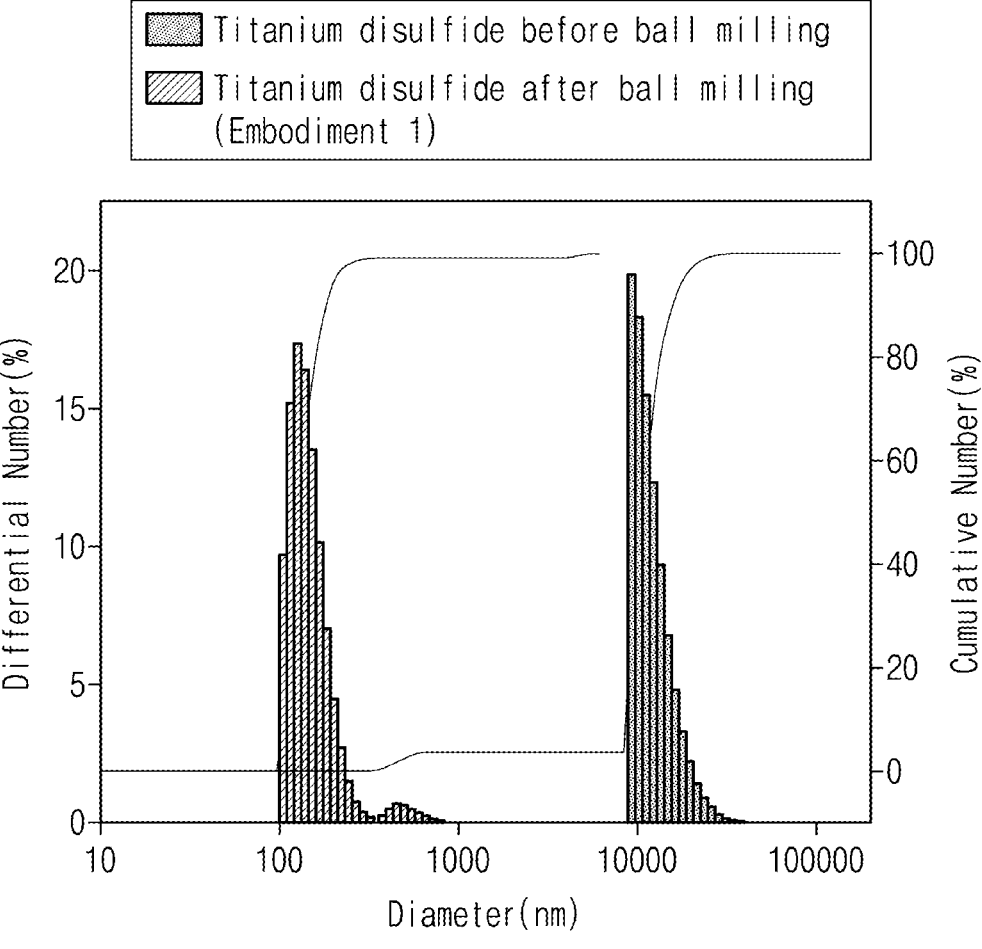
FIG. 3 is a graph showing a granularity analysis result of titanium disulfide before and after a ball milling process.
Figure 4:
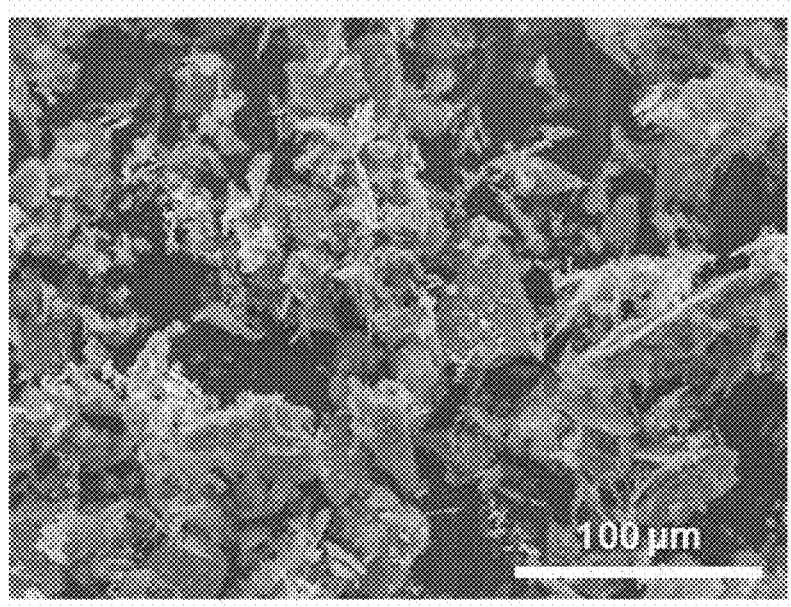
FIG. 4 is an electron microscope image showing the titanium disulfide before the ball milling process.
Figure 5:
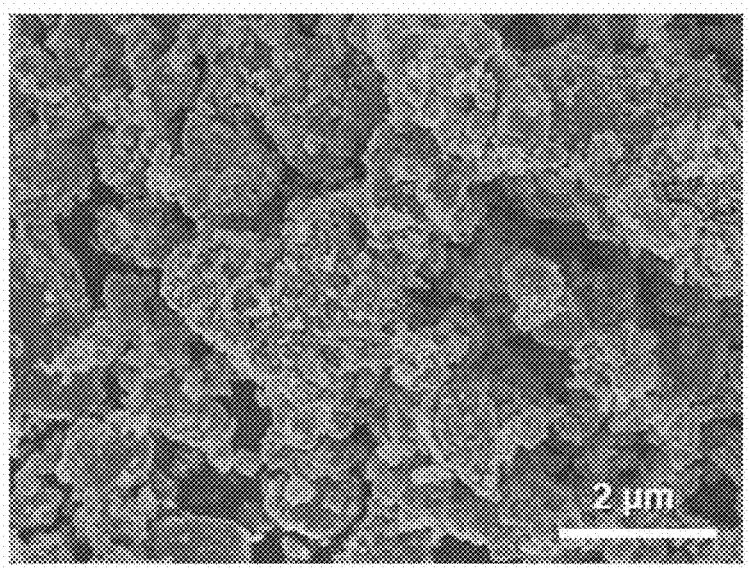
FIG. 5 is an electron microscope image showing the titanium disulfide after the ball milling process.

The analysis for a particle size of the active material before and after the ball milling is performed through a granularity analysis, and a result thereof is shown in FIG. 3. Referring to FIG. 3, it may be known that a mean particle size through the ball milling is reduced from about 11.8 μm to about 180 nm. FIG. 4 is an electron microscope image showing the titanium disulfide before the ball milling process. FIG. 5 is an electron microscope image showing the titanium disulfide after the ball milling process. It may be known that a result thereof is similar to the granularity analysis result.

Accordingly, it may be known that amorphousness of the titanium disulfide is increased as the titanium disulfide having an anisotropic structure is glomerated and differentiated through the ball milling process.

Embodiment 2

A solid electrolyte layer is manufactured by using $Li_6PS_5Cl$. The solid electrolyte layer having a thickness of about 500 μm is manufactured by applying a pressure of about 500 MPa to the $Li_6PS_5Cl$. The titanium disulfide having various loading levels (10~80 mg/cm²) and prepared in the embodiment 1 is uniformly applied onto the solid electrolyte layer. Polymeric binder is not added to check an ion diffusion effect of the titanium disulfide. Thereafter, a positive electrode having a pellet shape is manufactured by applying a pressure of about 500 MPa onto the titanium disulfide. An all-solid-state secondary battery is manufactured by using a negative electrode made of lithium metal of about 300 μm.

A charging and discharging characteristic evaluation of the all-solid-state secondary battery is performed at each of a temperature of about 25° C. and a temperature of about 60° C. The charging and discharging characteristic evaluation is performed in a range from about 2.7 V to about 1 V. In case of charging, primary charging is performed to about 2.7 V based on a constant current, and then full charging is performed by implementing a constant voltage that maintains about 2.7 V until a ⅕ value of an initial current. Discharging is performed based on a constant current. Since a titanium disulfide-lithium secondary battery is already charged, discharging is firstly performed, and then charging and discharging is performed. A charging and discharging characteristic is measured based on about 0.1 C-rate, and a mean capacity is calculated except for a primary discharge capacity.

Figure 6:
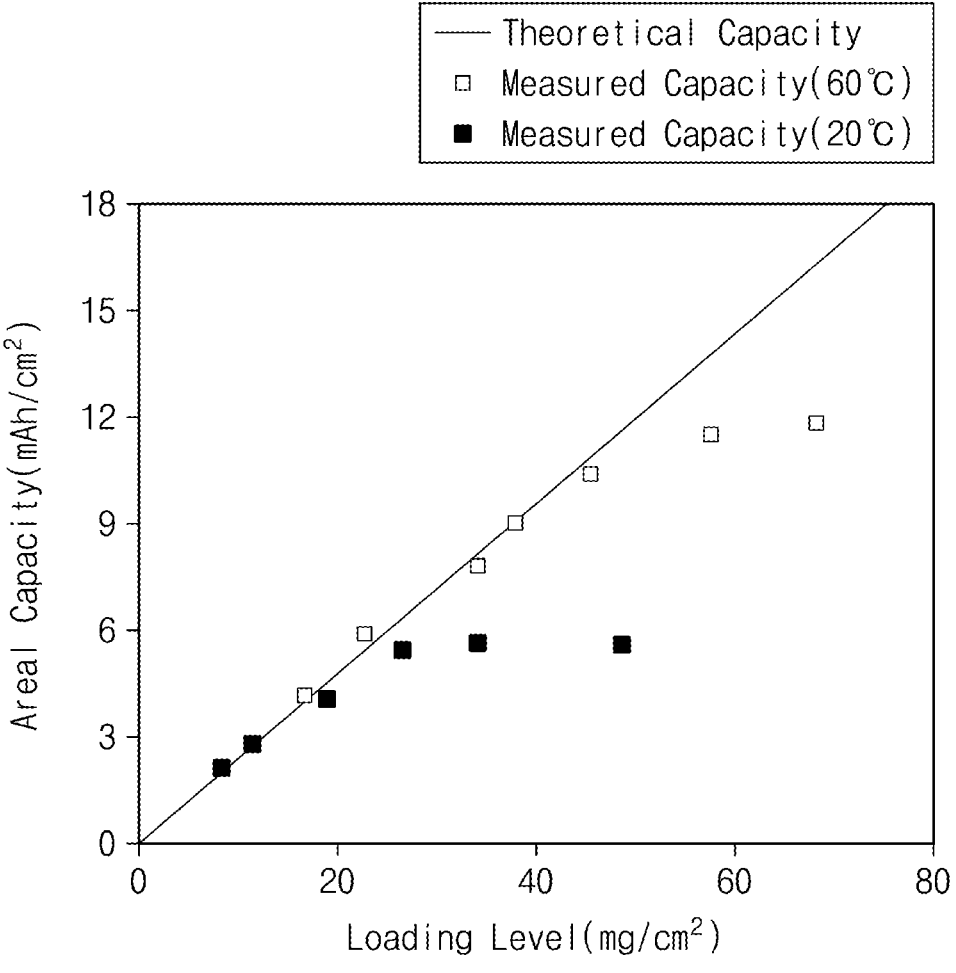
FIG. 6 is a graph showing results obtained by evaluating a capacity of the all-solid-state secondary battery according to an embodiment based on loading levels and temperatures.
Figure 7:
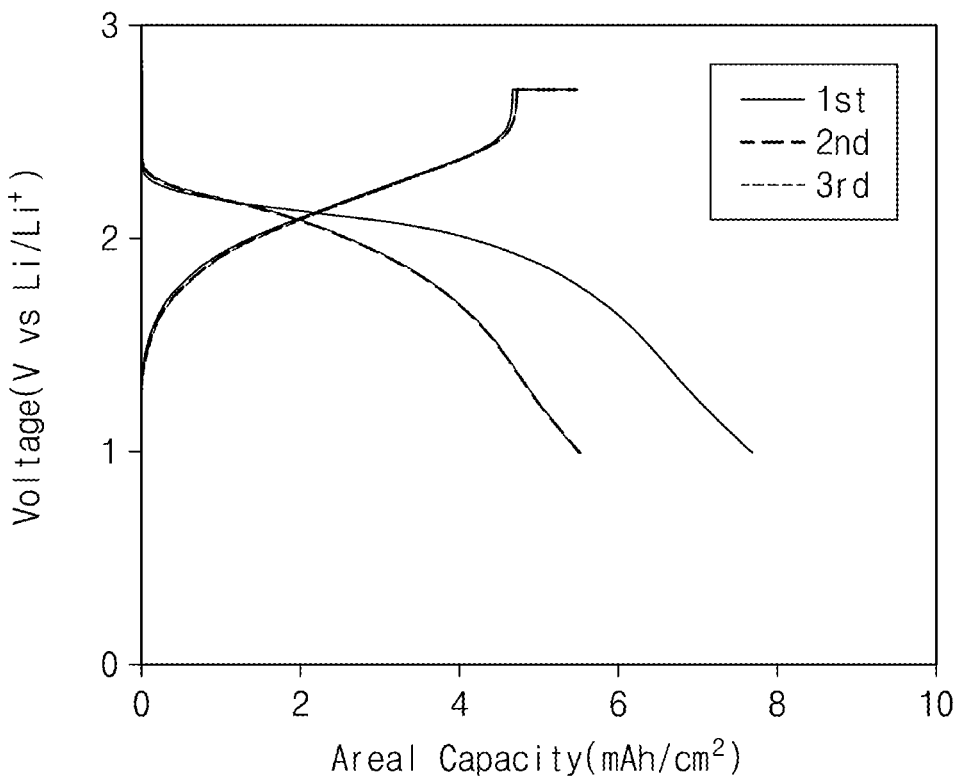
FIG. 7 is a graph showing results obtained by evaluating a performance of an electrode having a loading level of about 26.5 mg/cm² at a temperature of about 25° C. according to an embodiment.
Figure 8:
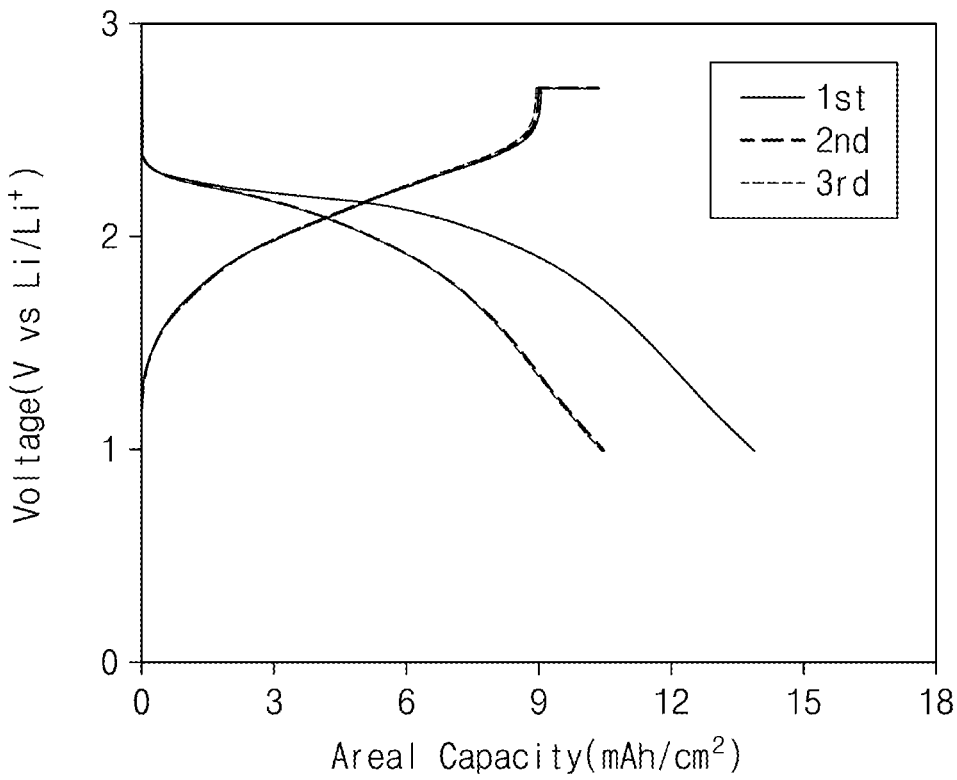
FIG. 8 is a graph showing results obtained by evaluating a performance of an electrode having a loading level of about 45.5 mg/cm² at a temperature of about 60° C. according to an embodiment.

Results obtained by measuring a mean capacity of a titanium disulfide positive electrode according to various loading levels at a temperature of about 25° C. and 60° C. are shown in FIG. 6. Referring to FIG. 6, it may be known that a capacity close to a theoretical capacity is realized until a loading level of about 20 mg/cm² at a temperature of about 25° C., and a capacity close to a theoretical capacity is realized until a loading level of about 50 mg/cm² at a temperature of about 60° C. This may represent that the titanium disulfide having increased amorphousness allows lithium ions to move through diffusion between active materials as a solid electrolyte is not contained in the electrode. FIG. 7 is a graph showing a charging and discharging characteristic of a secondary battery having a loading level of about 26.5 mg/cm² at a temperature of about 25° C. It may be known that a charging and discharging characteristic of about 86% of a theoretical capacity is exhibited. FIG. 8 is a graph showing a charging and discharging characteristic of a secondary battery having a loading level of about 45.5 mg/cm² at a temperature of about 60° C. It may be known that a charging and discharging characteristic of about 95% of a theoretical capacity is exhibited, and implementation of a capacity of about 10 mAh/cm² is meaningful.

Comparative Example 1

Figure 9:
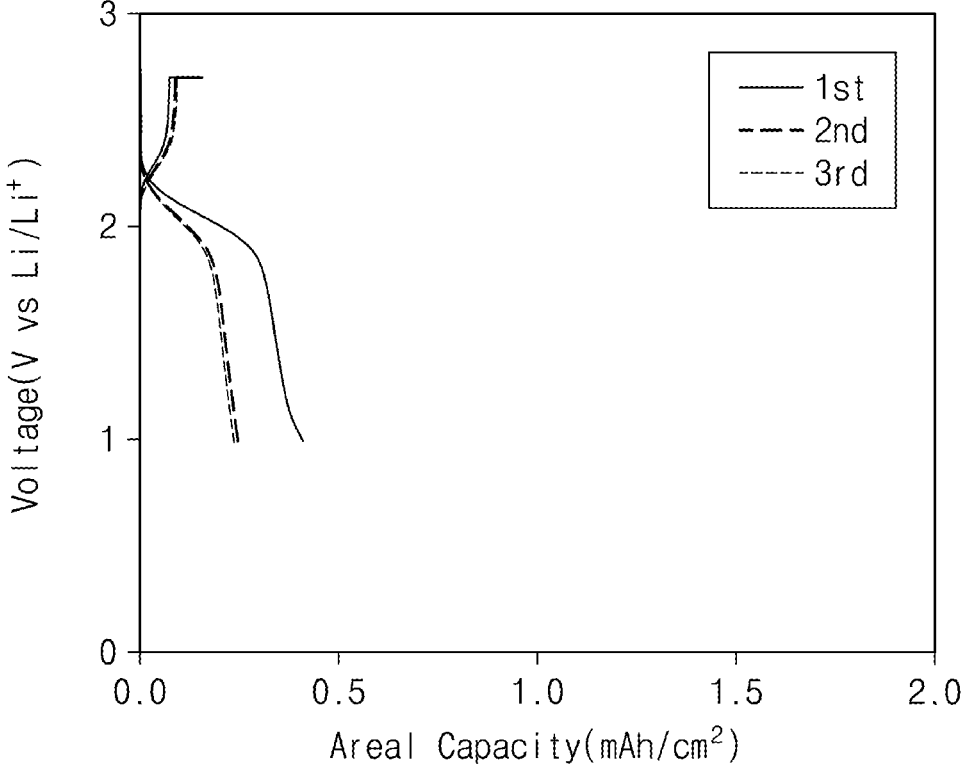
FIG. 9 is a graph showing results obtained by evaluating a performance of an electrode at a temperature of about 60° C. according to a comparative example.

An all-solid-state secondary battery is manufactured by the substantially same method as that of the embodiment 2 except for a feature of using titanium disulfide having high crystallinity. The all-solid-state secondary battery is configured such that a loading level of titanium disulfide is about 22.7 mg/cm², and a theoretical capacity is about 5.43 mAh/cm². A charging and discharging characteristic is evaluated by the substantially same method as that of the embodiment 2. Results obtained by measuring the charging and discharging characteristic with a condition of about 0.1 C-rate at a temperature of about 60° C. are shown in FIG. 9. Referring to FIG. 9, it may be known that only a capacity of about 0.25 mAh/cm² is realized. As described above, this is because lithium ions may not uniformly move into the electrode due to difficulty of interlayer movement in case of the titanium disulfide having high crystallinity. In addition, a space for inserting the lithium ions into the active material is extremely limited due to a huge anisotropic structure of the titanium disulfide having high crystallinity. It may be known through the comparative example 1 that the charging and discharging characteristic of the differentiated and amorphous sulfide-based active material is improved.

The all-solid-state secondary battery according to an embodiment of the inventive concept may secure the ion path by the ion diffusion even without the solid electrolyte in the electrode as the contact area between the active materials closely adjacent to each other is increased. Finally, the all-solid-state secondary battery having the maximized energy density by maximally increasing the content of the active material in the electrode may be implemented, and the processibility of the electrode manufacturing design may be improved because the solid electrolyte is not contained in the electrode.

Although the embodiments of the present invention have been described, it is understood that the present invention should not be limited to these embodiments but various changes and modifications can be made by one ordinary skilled in the art within the spirit and scope of the present invention as hereinafter claimed. Therefore, the embodiments described above include examples in all respects and not restrictive, but it should be understood.

What is claimed is:

1. An all-solid-state secondary battery comprising:
   a positive electrode;
   a negative electrode comprising a lithium metal; and
   a solid electrolyte layer disposed between the positive electrode and the negative electrode;
   wherein the positive electrode comprises a sulfide-based active material, the sulfide-based active material has a particle size of about 50 nm to about 5 μm,
   the sulfide-based active material has amorphousness sufficiently high to have a grain size of about 1 nm to about 10 nm,
   the sulfide-based active material includes a titanium disulfide, and
   the solid electrolyte layer includes a sulfide-based material, or an oxide-based material, or both.

2. The all-solid-state secondary battery of claim 1, wherein the sulfide-based active material consists of the titanium disulfide.

3. The all-solid-state secondary battery of claim 1, wherein at least one of the positive electrode or the negative electrode comprises a polymeric binder, and
   a concentration of the polymeric binder is 0.01 wt % to 5 wt %.

4. The all-solid-state secondary battery of claim 3, wherein the polymeric binder comprises at least one of polytetrafluoroethylene, polyvinylidene fluoride (PVdF), poly(ethylene oxide), polyacrylonitrile, hydroxypropyl cellulose, carboxymethyl cellulose, styrene-butadiene, nitrile-butadiene rubber, polyacrylate, or polyacrylic acid.

5. The all-solid-state secondary battery of claim 1, wherein at least one of the positive electrode or the negative electrode comprises an electro-conducting agent, and a concentration of the electro-conducting agent is 0.01 wt % to 5 wt %.

6. The all-solid-state secondary battery of claim 5, wherein the electro-conducting agent comprises at least one of graphite, hard/soft carbon, carbon fibers, carbon nanotubes, linear carbon, carbon black, acetylene black, or ketjen black.

7. The all-solid-state secondary battery of claim 1, wherein each of the positive electrode and the negative electrode has a porosity greater than 0 and equal to or less than 15%.

8. The all-solid-state secondary battery of claim 1, wherein the sulfide-material of the solid electrolyte layer includes one selected from the group consisting of $Li_{4-x}$ $Ge_{1-x}P_xS_4$ (LGPS), $Li_3PS_4$ glass-ceramic, $Li_7P_3S_{11}$ glass-ceramic (LPS), $Li_4SnS_4$, and $Li_6PS_5X$ (X=I, Br or Cl).

9. The all-solid-state secondary battery of claim 1, wherein the oxide-based material of the solid electrolyte layer includes one selected from the group consisting of $Li_{3x}La_{2/3-x}TiO_3$ (LLTO), $Li_{i+x}Ti_{2-x}M_x$ $(PO_4)_3$ (M=AI, Ga, In or Sc), and $Li_7La_3Zr_2O_{12}$ (LLZO).

\* \* \* \* \*